(12) United States Patent
Bertrand

(10) Patent No.: US 11,281,340 B2
(45) Date of Patent: Mar. 22, 2022

(54) RADIO FREQUENCY TRANSPARENT CAPACITIVE TOUCH SYSTEMS AND METHODS

(71) Applicant: Cirque Corporation, Salt Lake City, UT (US)

(72) Inventor: Jon Bertrand, Taylorsville, UT (US)

(73) Assignee: Cirque Corporation, Sandy, UT (US)

( * ) Notice: Subject to any disclaimer, the term of this patent is extended or adjusted under 35 U.S.C. 154(b) by 9 days.

(21) Appl. No.: 16/713,677

(22) Filed: Dec. 13, 2019

(65) Prior Publication Data

US 2021/0181871 A1 Jun. 17, 2021

Related U.S. Application Data

(60) Provisional application No. 62/794,392, filed on Jan. 18, 2019.

(51) Int. Cl.
*G06F 3/044* (2006.01)
*H01Q 1/22* (2006.01)
*H01Q 1/42* (2006.01)

(52) U.S. Cl.
CPC .......... *G06F 3/044* (2013.01); *H01Q 1/2266* (2013.01); *H01Q 1/421* (2013.01); *H01Q 1/2291* (2013.01)

(58) Field of Classification Search
CPC ...... G06F 3/044; H01Q 1/2266; H01Q 1/421; H01Q 1/2291; H01Q 1/243; H01Q 1/2283; H01Q 1/2208; H01Q 1/2216; H01Q 1/2225; H02J 50/12; H02J 50/20
See application file for complete search history.

(56) References Cited

U.S. PATENT DOCUMENTS

| | | | |
|---|---|---|---|
| 2,488,710 A | 11/1949 | Cooper | |
| 6,380,930 B1* | 4/2002 | Van Ruymbeke | G06F 1/1616 178/18.01 |
| 6,833,603 B1* | 12/2004 | Park | H01L 27/08 257/528 |
| 9,223,352 B2 | 12/2015 | Smith | |
| 10,606,323 B1* | 3/2020 | Chang | G06F 1/1698 |
| 10,820,457 B1* | 10/2020 | Kishi | H05K 9/0084 |
| 2012/0087065 A1* | 4/2012 | Kim | G06F 1/1656 361/679.01 |
| 2013/0341409 A1* | 12/2013 | Wu | G06K 19/07773 235/492 |
| 2014/0253830 A1* | 9/2014 | Li | G06F 3/0443 349/12 |
| 2014/0362038 A1* | 12/2014 | Murakami | G06F 3/0446 345/174 |
| 2016/0124574 A1 | 5/2016 | Rouaissia | |
| 2017/0288314 A1* | 10/2017 | Kagawa | H01Q 17/007 |
| 2018/0032166 A1* | 2/2018 | Orihara | G06F 3/03547 |
| 2019/0121396 A1* | 4/2019 | Ha | G06F 1/183 |
| 2019/0148988 A1* | 5/2019 | Hwang | H01Q 1/526 307/104 |
| 2020/0201470 A1* | 6/2020 | Oh | H01Q 9/0407 |

* cited by examiner

*Primary Examiner* — Kent W Chang
*Assistant Examiner* — Sujit Shah

(57) ABSTRACT

Touch sensor systems and methods are disclosed including a radio frequency antenna that can be placed on or very near the touch pad. The touch pad sensor includes a patterned shielding that shields the touch pad sensor from back-side signals and has opening that are large enough to allow radio frequencies to pass through the touch pad sensor.

20 Claims, 11 Drawing Sheets

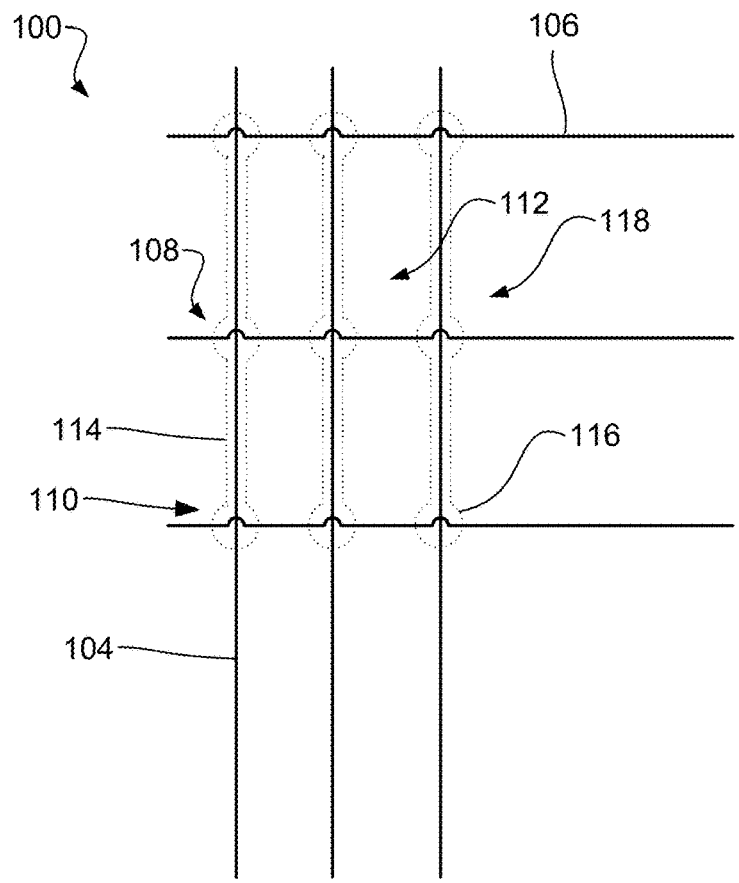
Fig. 6
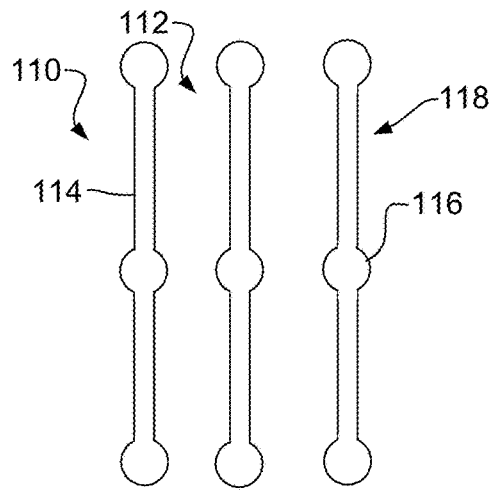 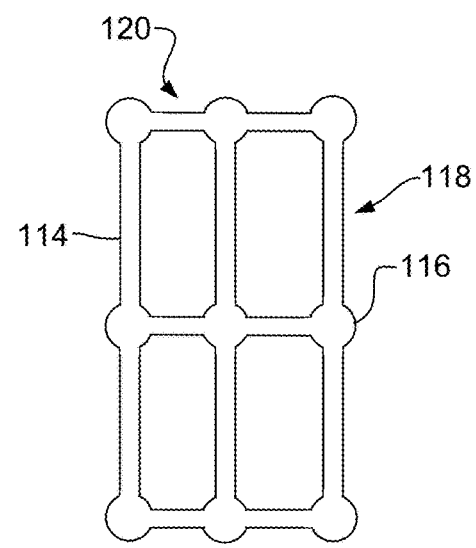
Fig. 7      Fig. 8

RADIO FREQUENCY TRANSPARENT CAPACITIVE TOUCH SYSTEMS AND METHODS

CROSS REFERENCE TO RELATED APPLICATIONS

The present Application claims priority to U.S. Provisional Patent Application No. 62/794,392 by Jon Bertrand et al., entitled "Radio Frequency Transparent Capacitive Touch Systems and Methods," filed on Jan. 18, 2019, assigned to the assignee hereof, and expressly incorporated by reference herein.

FIELD OF THE DISCLOSURE

This disclosure relates generally to capacitive sensors, such as a touch pad, and methods of operation. More particularly, this disclosure relates to systems and methods for enabling radio frequencies to transmit and receive through the touch pad.

BACKGROUND

Touch pads are often included on processor-based devices, such as laptop computers or the like, in order to allow a user to use fingers, styli, or the like as a source of input and selection. Additionally, processor-based devices often include radio frequency (e.g., 3 MHz-30 GHz) transmitters, receivers, transceivers, or the like (collectively, "transceivers" herein) for WiFi, Bluetooth, near field communications (NFC), or the like. However, capacitive touch pads often require electrical shielding to prevent noise from the processor-based device from interfering with normal touch pad functions. When in proximity to the radio transceiver that shielding may prevent transmission and reception of the radio frequencies.

For example, a touch pad might be the only opening in the chassis of a processor-based device (such as a laptop) and that single opening may be used for multiple purposes, such as sending and receiving WiFi or NFC communications. Existing devices may place the radio frequency antenna near (e.g., underneath) the touch pad and hatch the touch pad ground plane shielding to allow some of the radio frequencies through the shielding. However, this approach often requires tuning the antenna to transmit through the shielding and tuning is often difficult. Further, the antenna system will likely waste more power than a typical installation and the performance of the touch pad may be still affected. Additionally, the above-described system may be more difficult to manufacture due to variations in the touch pad printed circuit board (PCB) affecting the antenna resonance. Other drawbacks, inconveniences, and issues with existing devices and methods also exist.

SUMMARY

Accordingly, disclosed embodiments address the above-noted, and other, drawbacks, inconveniences, and issues with existing devices and methods. Disclosed embodiments include touch sensor systems and methods including a radio frequency antenna that can be placed on or very near the touch pad. The touch pad sensor includes a patterned shielding that shields the touch pad sensor from back-side signals and has openings that are large enough to allow radio frequencies to pass through the touch pad sensor. The patterned shielding replaces the typical ground plane with a layer that is designed to shield the mutual capacitance junctions but leave the center of each touch pad sensor cell open (to allow radio frequency to pass through). Additionally, the patterned shielding is divided into individual cells that shield individual sensor junctions. The shielding cells may be connected in a pattern that minimizes the induced current from an NFC antenna and reduce the power of the NFC system. In some cases, connecting the shielding cells radially may minimize the induced current. In other examples, the shielding cells may be connected in other configurations to reduce the induced current. Other embodiments, advantages, and features also exist.

In some examples, an apparatus may include a touch sensor, a first antenna, a shield structure positioned between the touch sensor and the first antenna, and at least one radio frequency transparent section incorporated into the shield.

The shield structure may include a metal layer deposited on an electrically insulating material, and the radio frequency transparent section includes an opening defined in the metal layer.

The touch sensor may include a mutual capacitance intersection between a first electrode and a second electrode; and the radio frequency transparent section is offset from the mutual capacitance intersection.

The metal layer may overlap with the mutual capacitance intersection.

The metal layer may have an increased area that overlaps with the mutual capacitance intersection.

The touch sensor may include first mutual capacitance intersection spaced away from the first antenna at a first distance and a second mutual capacitance intersection spaced away from the first antenna at a second distance where the second distance is farther away from the first antenna than the first distance.

The touch sensor may include a first metal layer area of the shield structure overlapping with the first mutual capacitance intersection is smaller than a second metal layer area of the shield structure overlapping with the second mutual capacitance intersection.

The shield structure further may include a metal layer deposited on an electrically insulating material, and the radio frequency transparent section includes multiple shield openings defined in the metal layer.

At least some of the multiple openings may become progressively smaller as the distance from the first antenna increases.

The shield structure may include a first region with a first subset of shield openings having a first size and a second region with a second subset of shield openings having a second region having a second size, wherein the first region is closer to the first antenna than the second region, and wherein the first size is larger than the second size. In some cases, first size is used uniformly throughout the first region, and the second size is used uniformly throughout the second region. In other examples, the sizes may transition over distance from a first size to a second size.

The apparatus may include a second antenna and a second radio frequency transparent section incorporated into the shield structure that is sized based at least in part on a proximity to the second antenna. The first radio frequency transparent section may be sized based at least in part on a proximity to the first antenna.

In some examples, an apparatus may include a touch sensor, an antenna, a shield structure positioned between the touch sensor and the first antenna, and patterned shielding areas incorporated into the shield structure.

The patterned shielding areas may be separated by openings defined in electrically conductive material.

The patterned shielding areas may be positioned to shield mutual capacitance junctions of the touch sensor while leaving a center of at least some touch sensor cells open to allow radio frequency to pass through.

The patterned shielding areas may be positioned to shield individual sensor junctions.

The antenna may be configured to transmit a WiFi signal.

The patterned shielding areas may be connected radially.

The patterned shielding areas may be configured to minimize an induced current from a near field communication antenna and reduce the power of a near field communication system.

In some examples, an apparatus may include a touch sensor, an antenna, a shield structure positioned between the touch sensor and the antenna, and multiple shield openings defined in an electrically conductive layer of the shield structure that are large enough to allow radio frequency to pass through the shield structure.

The electrically conductive layer may define the shield openings with multiple vertical columns and multiple horizontal rows positioned overlap with a grid of electrode in the touch sensor.

Multiple shield openings may be located in a first region of the touch sensor proximate to the antenna and the shield structure comprises a solid electrically conductive layer without shield openings in a second region of the touch sensor that is spaced farther away from the antenna than the first region.

BRIEF DESCRIPTION OF THE DRAWINGS

FIG. 6 depicts an example of a shield structure in accordance with disclosed embodiments.

FIG. 7 depicts an example of a shield structure in accordance with disclosed embodiments.

FIG. 8 depicts an example of a shield structure in accordance with disclosed embodiments.

Figure 1:
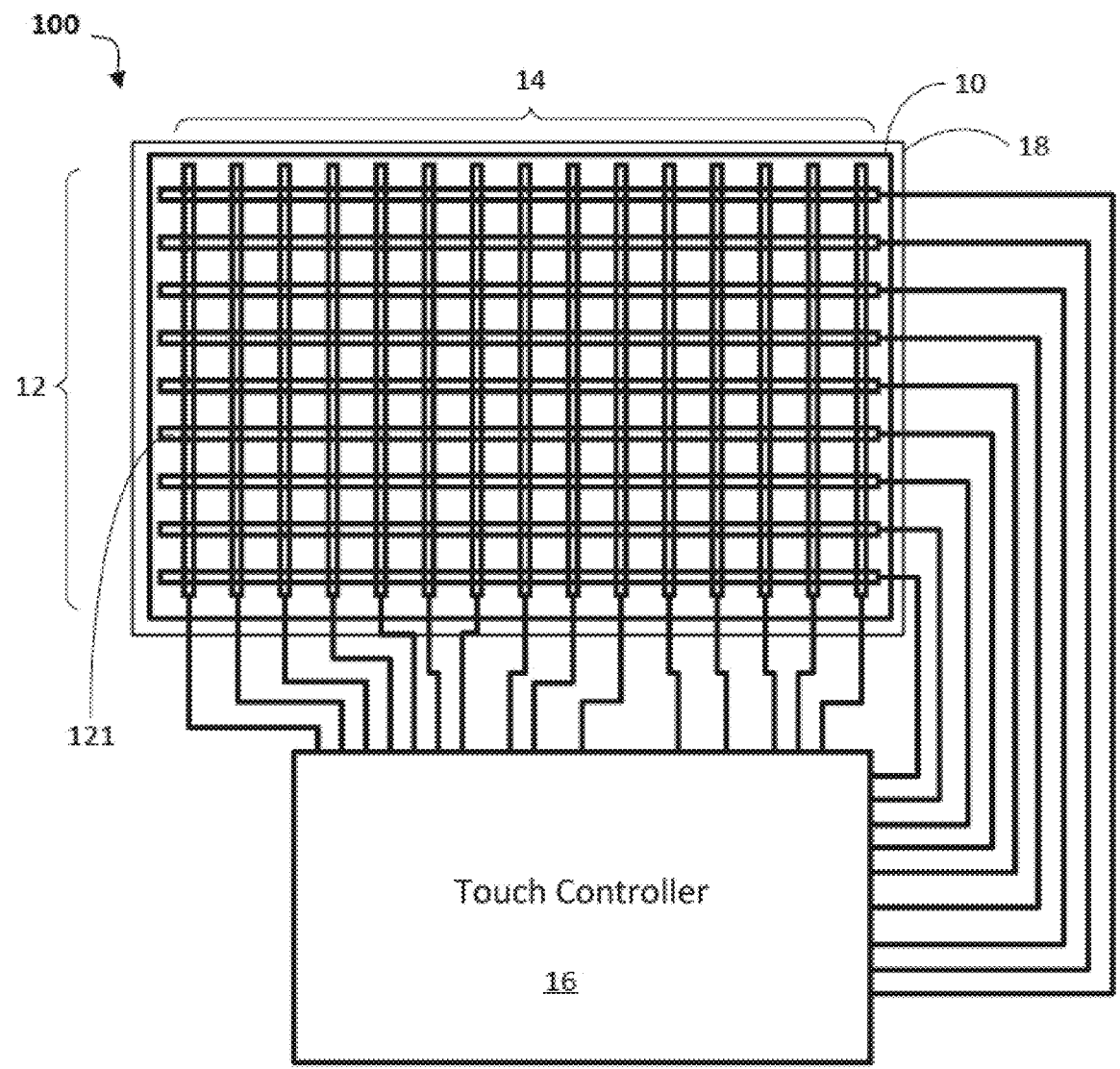
FIG. 1 depicts an example of a capacitive touchpad system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" generally refers to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, and the term "Rx" generally refers to a sense line.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "touchpad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

The present invention utilizes touchpad technology from CIRQUE® Corporation. Accordingly, it is useful to understand operation of the touchpad technology to a degree. The touchpad technology from CIRQUE® Corporation is a mutual capacitance sensing device 100 and an example is illustrated in FIG. 1. For this device 100 a touchpad 10 having a grid of row 12 and column 14 electrodes is used to define the touch-sensitive area of the touchpad 10. Typically, the touchpad is configured as a rectangular grid of an appropriate number of electrodes (e.g., 8-by-6, 16-by-12, 9-by-15, or the like).

As shown in FIG. 1, the mutual capacitance sensing device 100 also includes a touch controller 16. Touch controller 16 typically includes at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

Typically, touch controller 16 also includes at least one multiplexing circuit to alternate which of the row 12 or column 14 electrodes are operating as a drive electrode or a sense electrode. The driving electrodes can be driven one at a time in sequence, or randomly, or all at the same time in encoded patterns. Other configurations are possible such as self-capacitance mode where the electrodes are driven and sensed simultaneously. Electrodes may also be arranged in non-rectangular arrays, such as radial patterns, linear strings, or the like. As also indicated in FIG. 1, a ground plane shield 18 may be provided beneath the electrodes 12, 14, to reduce noise or other interference. Shield 18 is shown as extending beyond electrodes 12, 14 merely for ease of illustration. Other configurations are also possible.

Typically, no fixed reference point is used for measurements. Touch controller 16 generates signals that are sent directly to the row 12 and column 14 electrodes in various patterns.

The touchpad 10 does not depend upon an absolute capacitive measurement to determine the location of a finger (or stylus, pointer, or other object) on the touchpad 10 surface. The touchpad 10 measures an imbalance in electrical charge to the electrode functioning as a sense electrode (exemplarily illustrated as row electrode 121 in FIG. 1, but can be any of the row 12, column 14, or other dedicated-sense electrodes). When no pointing object is on or near the touchpad 10, the touch controller 16 is in a balanced state, and there is no signal on the sense electrode (e.g., electrode 121). When a finger or other pointing object creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14.

Figure 2:
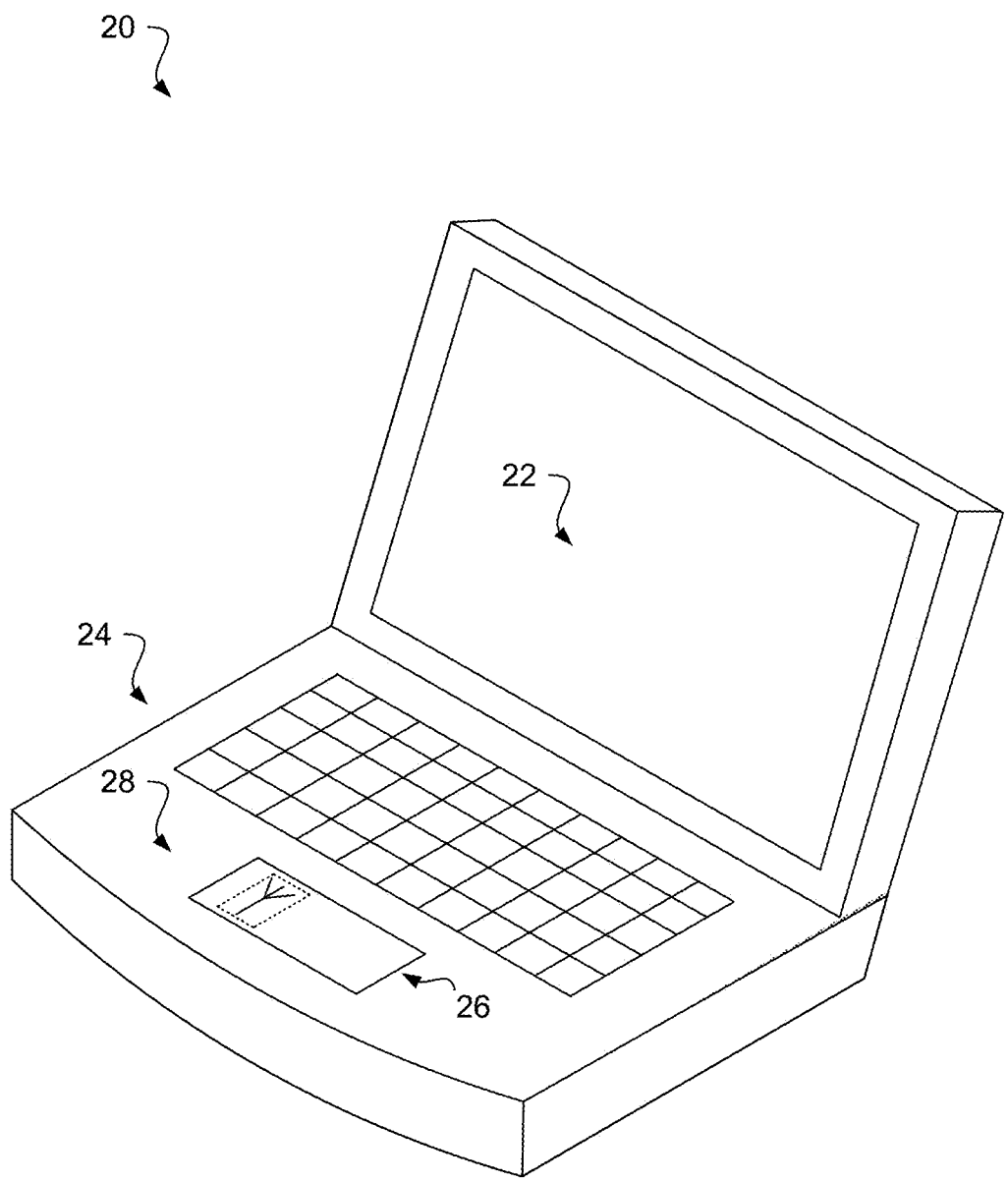
FIG. 2 depicts an example of a processor-based device including a touchpad and a radio frequency transmitter in accordance with disclosed embodiments.

FIG. 2 is a schematic top-down view of a processor-based device including a touchpad 26 and a radio frequency transmitter 28 in accordance with disclosed embodiments.

As shown for this embodiment, processor-based device may be a laptop 20 with a display 22, a keyboard 24, and a touchpad 26.

As also indicated, the laptop 20 may also include a radio frequency transceiver 28. In the embodiment of FIG. 2, the transceiver 28 is shown in dashed line to indicate that it is beneath touchpad 26, however, the location is merely exemplary and other locations may be used. Additionally, more than one transceiver 28 may be used or separate transmitters and receivers may be used.

Likewise, as a person of ordinary skill in the art having the benefit of this disclosure would understand, the type of transceiver 28 will vary with the function of the device. For example, for NFC applications transceiver 28 may operate in the 13.5 MHz frequency range, for Bluetooth applications transceiver 28 may operate in the 2.4-2.5 GHz range, and for WiFi applications transceiver 28 may operate in the 2.4 GHz, 5 GHz, or other frequency range. Other applications and frequency ranges are also possible.

Figure 3:
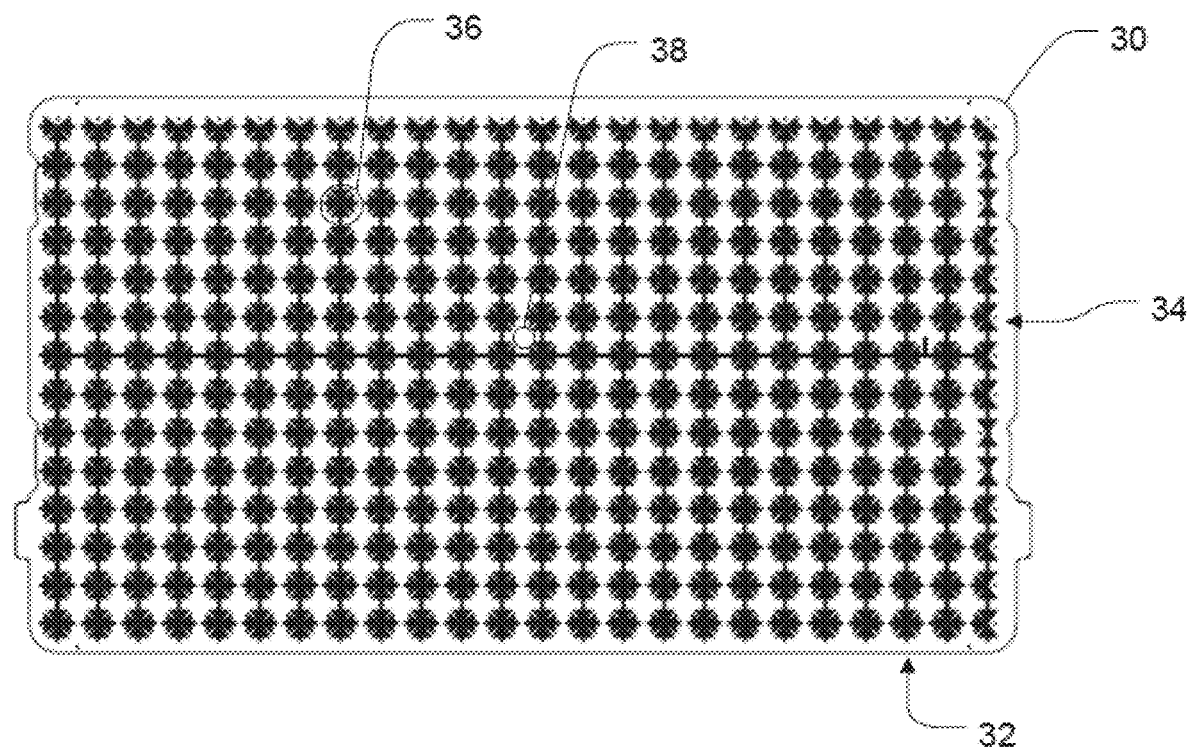
FIG. 3 depicts an example of a touchpad shield in accordance with disclosed embodiments.

FIG. 3 is a schematic top-down illustration of a touchpad shield 30 in accordance with disclosed embodiments. As disclosed herein, a solid or hatched ground plane shield (e.g., ground plane shield 18) may interfere with the higher radio frequencies typically employed by transceiver 28 or the like, however, it needs to shield the touchpad 28 from noise and other interference so that touchpad 28 may function properly. Thus, touchpad shield 30 is designed to have a high impedance at higher frequencies (e.g., 13.5 MHz for NFC, 900 MHz, 2.4 GHz, 5 GHz, etc., for WiFi) and low impedance at the touchpad 28 operating frequencies (e.g., 100 kHz to 3 MHz).

In some cases, a touchpad shield 30 may be constructed to replace a typical solid or hatched ground plane shield 18 with another layer that is a projection or combination of the touch sensor electrode layers (e.g., electrodes 12 and 14). In other examples, the touchpad shield may have a shape constructed to shield the junction areas while not shielding the areas far from the junctions. In the illustrated example of FIG. 3, a number of vertical rows 32 of shield material and horizontal rows 34 may be fashioned to lay under the corresponding electrode 12, 14 layers. The shield material may comprise copper, aluminum, or other appropriate shielding material and may be etched, printed, or otherwise deposited on a substrate. As shown, the touchpad shield 30 specifically shields the mutual capacitance junctions (e.g., junction 36) where the electrodes (e.g., electrodes 12, 14) overlap, but leaves the center (e.g., center 38) of each sensor cell open to allow radio frequencies to pass through. Additionally, the patterned shielding is divided into individual cells that shield individual sensor junctions. In some embodiments, the shielding cells may be connected to reduce and/or minimize the induced current from an NFC antenna or the like and reduce the power of the NFC system. In some cases, the cells may be connected radially, vertically, connected in other arrangements to reduce the induced currents. The particular shapes and rectangular grid shown for touchpad shield 30 in FIG. 3 are merely exemplary and other shapes and patterns may be used.

Figure 4:
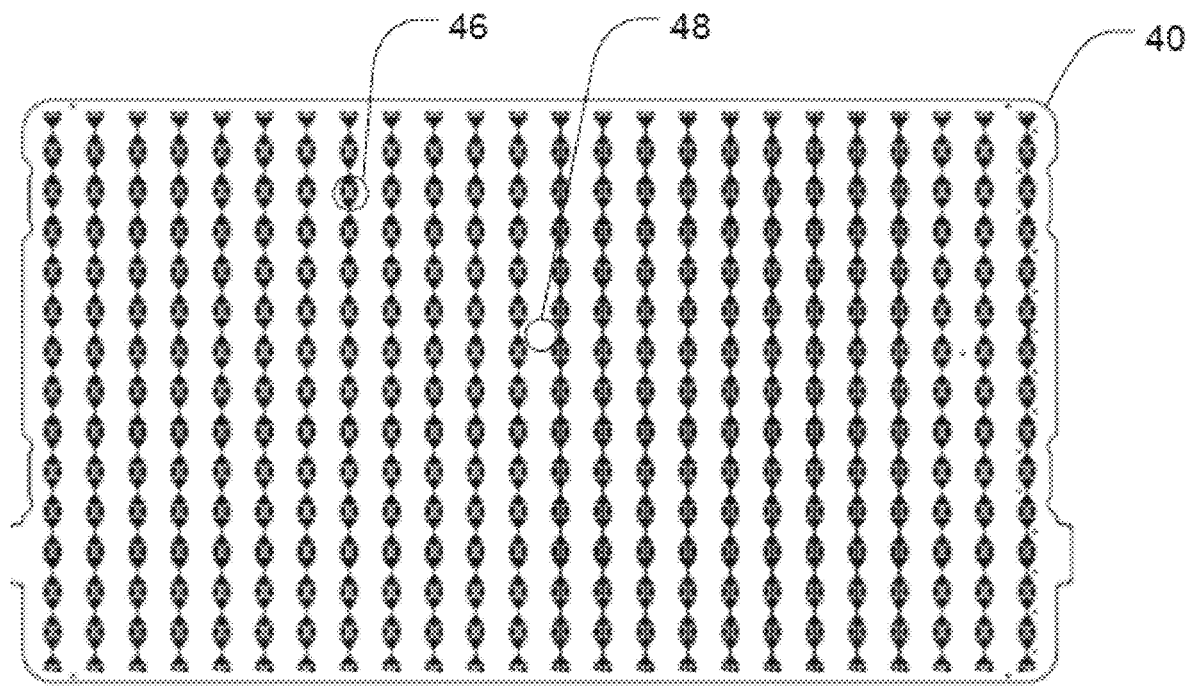
FIG. 4 depicts an example of a touchpad shield in accordance with disclosed embodiments.
Figure 5:
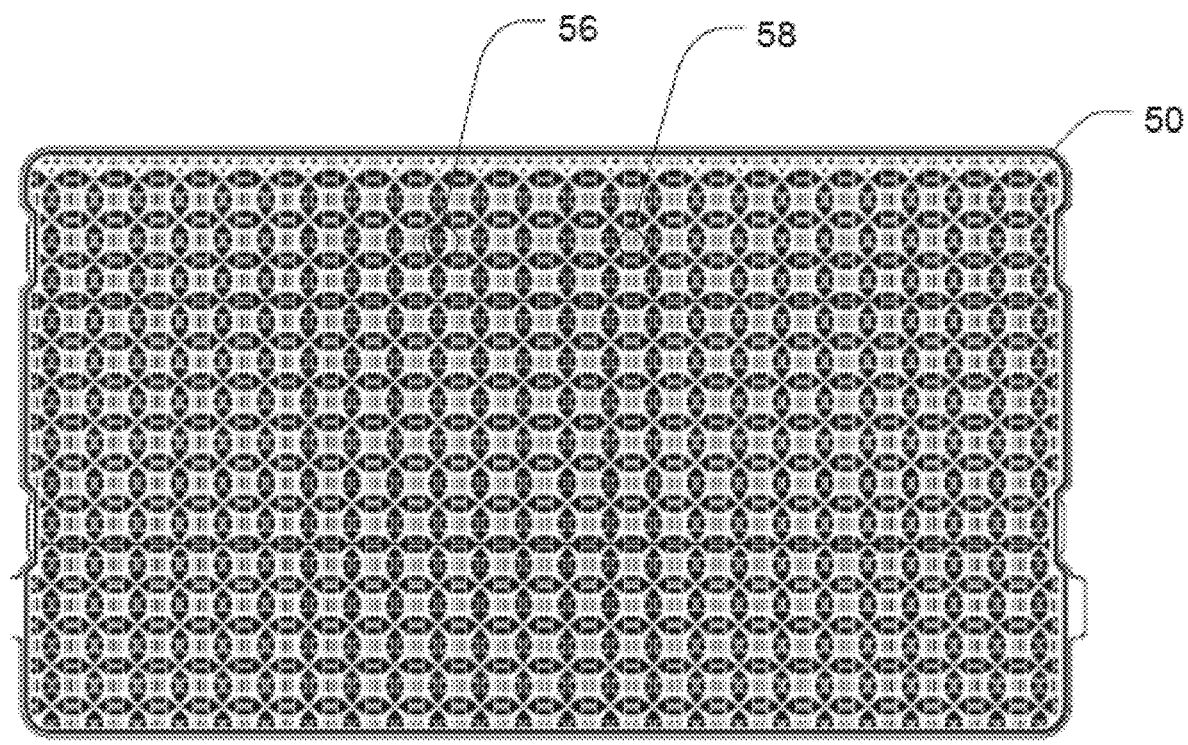
FIG. 5 depicts an example of a touchpad shield in accordance with disclosed embodiments.

For example, FIGS. 4-5 show other exemplary shapes and patterns that may be used in accordance with disclosed embodiments. FIG. 4 shows an embodiment of a touchpad shield 40 that has relatively smaller junctions 46 and relatively larger open centers 48 and FIG. 5 shows an embodiment of a touchpad shield 50 that has relatively denser junctions 56 and relatively smaller open centers 58. As a person of ordinary skill in the art having the benefit of this disclosure would understand, other shapes, patterns, junctions, open centers, and the like may be employed depending upon the functions and frequencies involved in a particular processor-based device, touchpad, transceiver, and the like.

FIG. 6 depicts an example of a grid 100 of electrodes of the touch sensor 102. In this example, multiple transmit electrodes 104 are disposed on a substrate and orthogonally arranged with sense electrodes 106 also disposed on the substrate. The transmit electrodes 104 and the sense electrodes 106 overlap with each other, but are electrically isolated from each other, forming mutual capacitance intersections 108. In some cases, the electrical insulation is provided through the substrate, with the transmit electrodes 104 being disposed on a first side of the substrate and the sense electrodes 106 being disposed on a second side of the substrate. In some cases, as the voltage changes on a first transmit electrode, the capacitance on each sense electrode crossed by the first transmit electrode changes at the intersection where the electrodes cross. Further, when an electrically conductive object approaches the touch sensor, the mutual capacitance intersections near the object touching or approaching the touch sensor have changes in their capacitance at these intersections.

In some examples, the surface of the touch sensor that is configured to receive touch or proximity signals from a user is on a front, interfacing surface. The surface of the touch sensor that includes the shield near or on the opposite side or back side of the touch sensor. The shield structure may be disposed between the back surface of the touch sensor and the antenna.

In the example of FIG. 6, the shield structure includes an electrically conductive layer 110 that defines openings 112. The wireless signals transmitted by the antenna can pass through the openings 112 defined in the electrically conductive layer 110. However, the portions of the electrically conductive layer 110 that remain may overlap with the transmit electrodes 104, the sense electrodes 106, the mutual capacitance intersections 108 between the transmit and sense electrodes, other portions of the touch sensor, or combinations thereof. In the illustrated example, the electrically conductive layer 110 includes narrow cross sectional width 114 that is aligned with the transmit electrodes 104. At those regions of the shield structure that overlap with the mutual capacitance intersections 108, the electrically conductive layer 110 includes in width and area forming a patterned shielding area 116 to provide more efficient shielding at the mutual capacitance intersections. In this example, the patterned shielding areas 116 are electrically connected in a vertical column 118 by the narrow cross sectional widths 114.

FIG. 7 depicts an example of an electrically conductive layer 110 with narrow cross sectional widths 114 and patterned shielding areas 116 overlapping at the mutually capacitive intersections. The openings 112 are defined by the space between the vertical columns 118. In this specific example, portions of the sensor electrodes are not shielded by a portion of the electrically conductive layer 110.

In the example of FIG. 8, the patterned shielding areas 116 are radially connected with additional narrow cross sectional widths 114 that overlap the sense electrodes forming a horizontal row 120. In this example, the openings are located between the vertical columns 118 and the horizontal rows 120. In some examples, radially connecting the vertical columns may minimize the induced current and/or reduce the needed power to transmit a wireless signal for some types of antennas.

Figure 9:
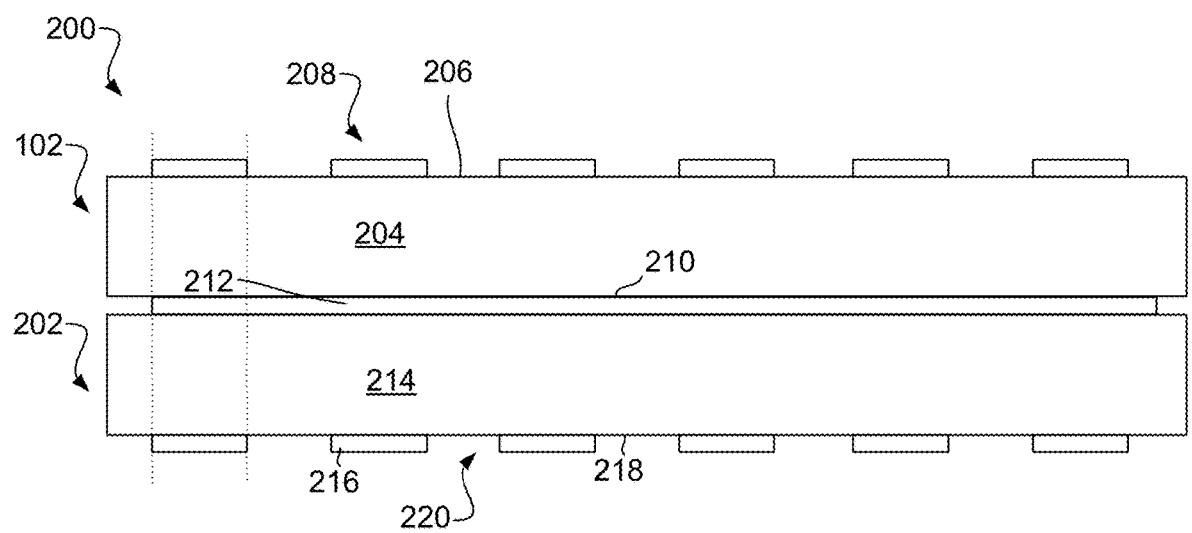
FIG. 9 depicts an example of a shield structure in accordance with disclosed embodiments.

FIG. 9 depicts a cross sectional view of a stack 200 with a touch sensor 102 and a shield structure 202. The touch sensor 102 may include a substrate 204. The substrate 204 may be any appropriate type of substrate, such as a printed circuit board, fiberglass, an electrically insulating material, another type of material, or combinations thereof. On a first side 206 of the substrate 204, a first set 208 of electrodes may be deposited. The first set 208 of electrodes may be transmit electrodes, sense electrodes, or another type of electrodes. On a second side 210 of the substrate 204 opposite of the first side 206, a second set 212 of electrodes may be deposited. The second set 212 of electrodes may be transmit electrodes, sense electrodes, or another type of electrodes. In this example, the first set 208 and the second set 212 of electrodes are orthogonal to each other.

Adjacent to the second set 212 of electrodes may be an electrically insulating material 214, and an electrically conductive material 216 may be deposited on the far side 218 of the electrically insulating material 214, opposite the second set 212 of electrodes.

The electrically conductive material 216 may shield certain portions of the touch sensor 102 from the radio frequencies emitted from an antenna. However, the electrically conductive material 216 may include openings 220 that all the radio frequencies to pass through the shielding material.

Figure 10:
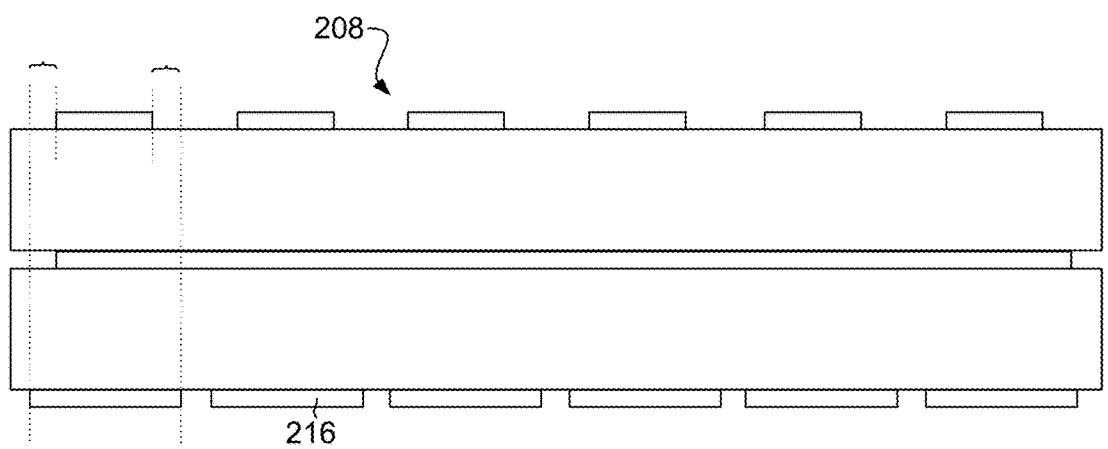
FIG. 10 depicts an example of a shield structure in accordance with disclosed embodiments.

In the example of FIG. 9, the width of the electrically conductive material 216 overlapping with the mutual capacitance intersections is as wide as the electrodes in the first set 208. However, in the example of FIG. 10, the width of the electrically conductive material 216 is wider than the width of the electrodes of the first set 208 of electrodes or wider than the mutual capacitance intersection. The width of the electrically conductive material may depend on the tuning and/or other electrically characteristics of the antenna. However, width of the electrically conductive material 216 may also vary throughout the touch sensor based on the proximity to the antenna.

In some examples, it may be desirable to have larger openings in the electrically conductive material in those regions that are closer to the antenna. In such regions, the electrically conductive material 216 may cover less surface area allowing the openings to be larger thereby providing a larger amount of space for the radio frequencies to pass through. In those regions of the touch sensor that are located farther away from the antenna, the openings may be smaller with the electrically conductive material 216 covering a greater amount of the touch sensor's surface area.

Figure 11:
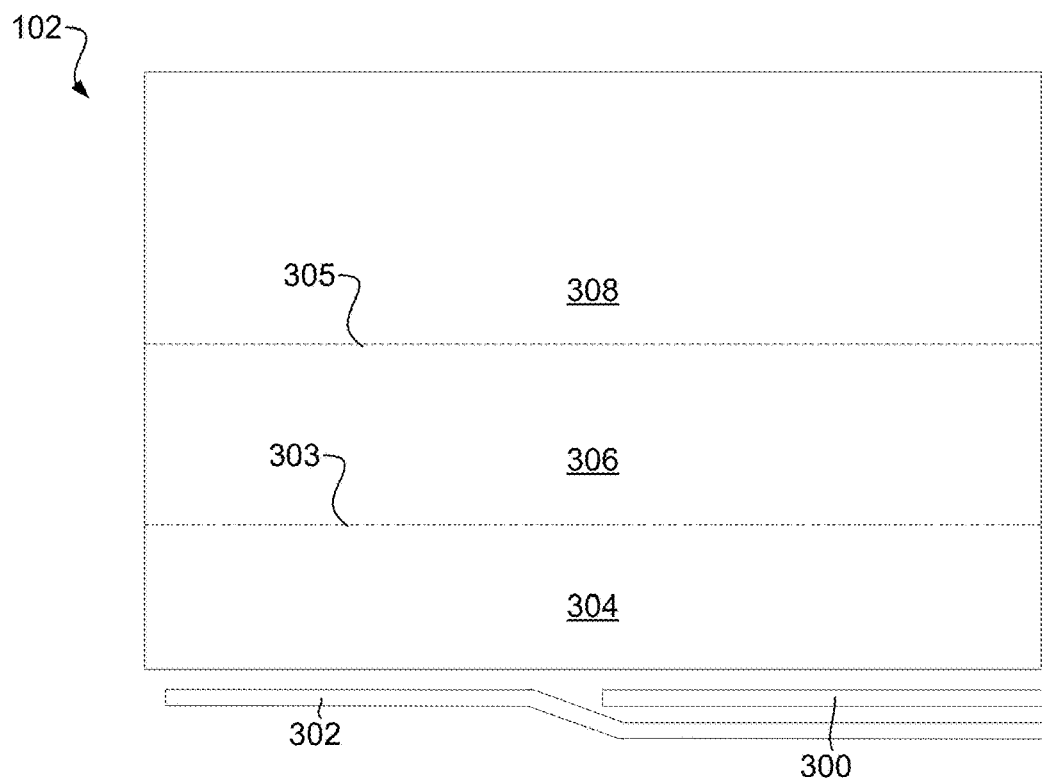
FIG. 11 depicts an example of a shield structure in accordance with disclosed embodiments.

FIG. 11 depicts an example of touch sensor 102, a first antenna 300, and a second antenna 302. In this example, the touch sensor 102 has a first region 304, second region 306, and a third region 308. The dashed lines 303 and 305 may generally represent boundary changes between the regions. The first region 304 may be the closest to the antenna 300, 302, the second region 306 may be the next closest to the antennas 300, 302, and the third region 308 may be located the farthest away from the antennas 300, 302. In this example, the openings in the shielding material of the first region 304 may be larger than in the other regions thus the shielding material may cover less overall surface area in the first region 304. In the second region 306, the shielding material may cover an increased amount of surface area making the openings smaller. In the third region 308, the openings may be the smallest allowing the shielding material to cover even more surface area than in the second region 306. In some cases, the shield material in the third region 308 may cover all the surface area without providing openings. The shield material may be the electrically conductive layer described in conjunction with the embodiments in FIGS. 3-10.

Figure 12:
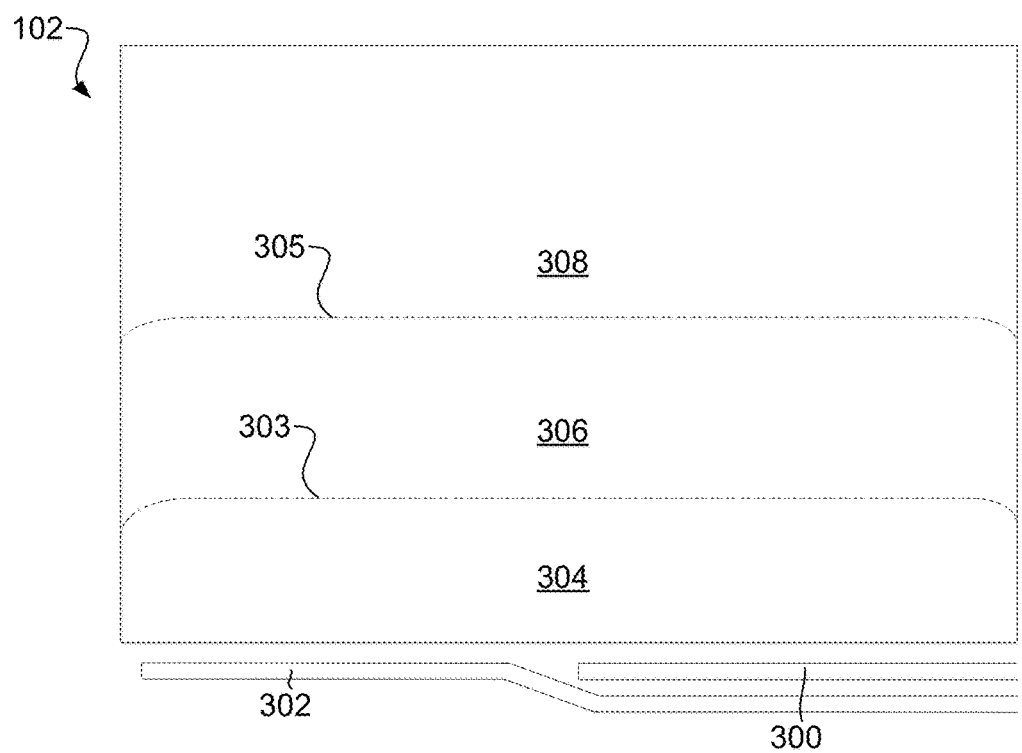
FIG. 12 depicts an example of a shield structure in accordance with disclosed embodiments.

FIG. 12 depicts an example of the boundary changes curving at the edges of the touch sensor 102. In this example, the boundary changes may reside at a predetermined distance from a surface of the antenna or an active portion of the antenna. In this example, the ends of the antennas do not reach the end of the touch sensor 102, thereby allowing the second and third regions 306, 308 of the touch sensor 102 to have greater areas.

Figure 13:
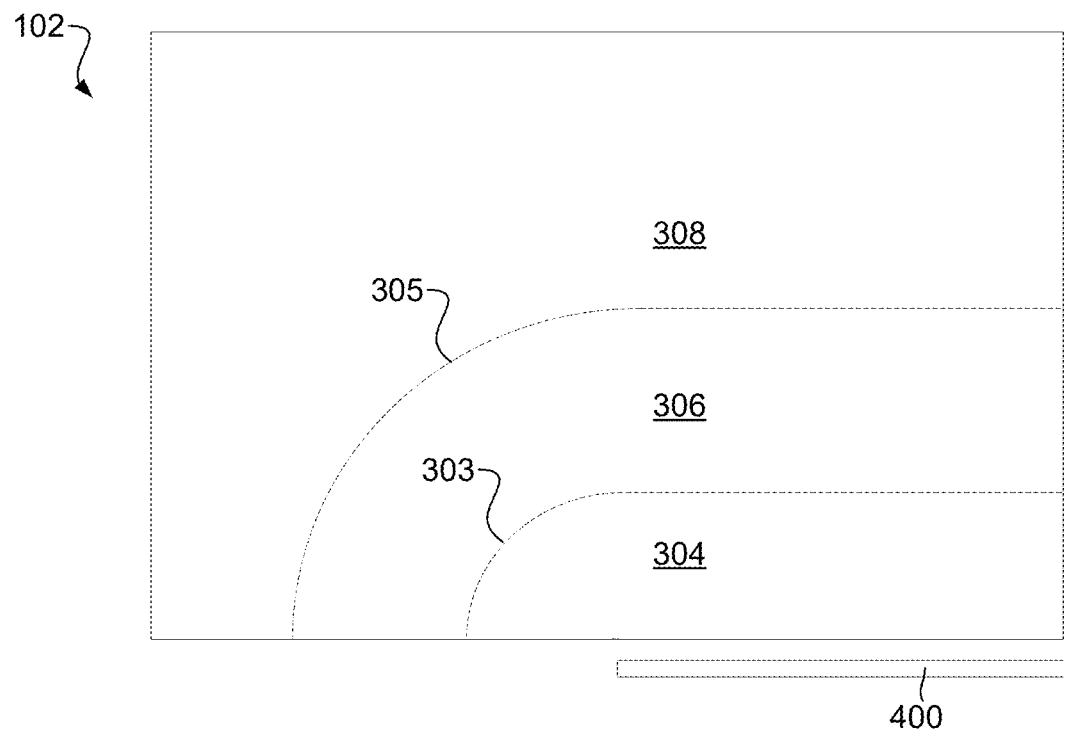
FIG. 13 depicts an example of a shield structure in accordance with disclosed embodiments.

In the example of FIG. 13, just a single antenna 400 is depicted adjacent to the touch sensor 102. In this example, the antenna 400 resides along just a portion of the length of the touch sensor 102. In this example, the boundaries to the first region 304 may decrease while the regions of the second region 306 and third region 308 may increase.

Figure 14:
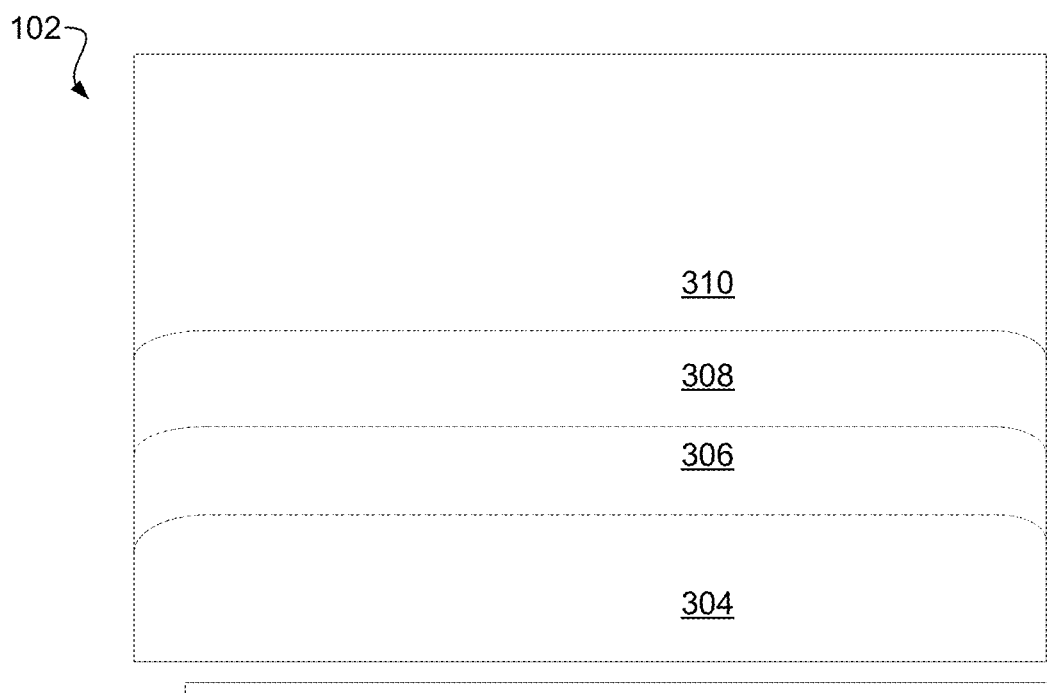
FIG. 14 depicts an example of a shield structure in accordance with disclosed embodiments.

The touch sensor 102 may include any appropriate number of regions with different amounts of shield material. For example, FIG. 14 depicts that the touch sensor 102 may include more than four regions 304, 306, 308, 310, but more regions are included in other embodiments. In some examples, just two regions may exist that have different amounts of shielding.

Figure 15:
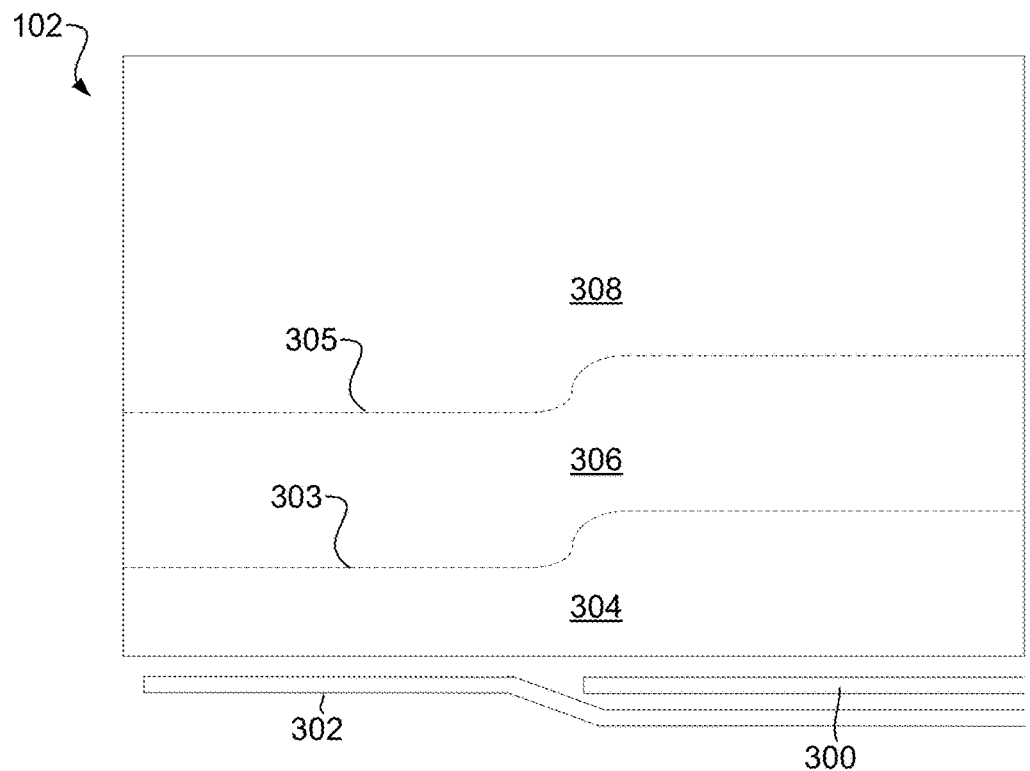
FIG. 15 depicts an example of a shield structure in accordance with disclosed embodiments.

Further, the geometries of those regions with varying amounts of shielding may have different amounts of surface area. In the example of FIG. 15, the boundaries 303, 305 between the regions are irregular. In this example, the boundary regions 303, 305 may be shaped to accommodate the different characteristics of each antenna. For example, it may be desirable for the first region 304 to have more area based on the electrical characteristics of the first antenna 300, while it may be more desirable for the first region 304 to have less area due to the second antenna's electrical characteristics. Thus, the geometry of the different regions may include having less area on one side of the touch sensor 102 than on the other side.

Figure 16:
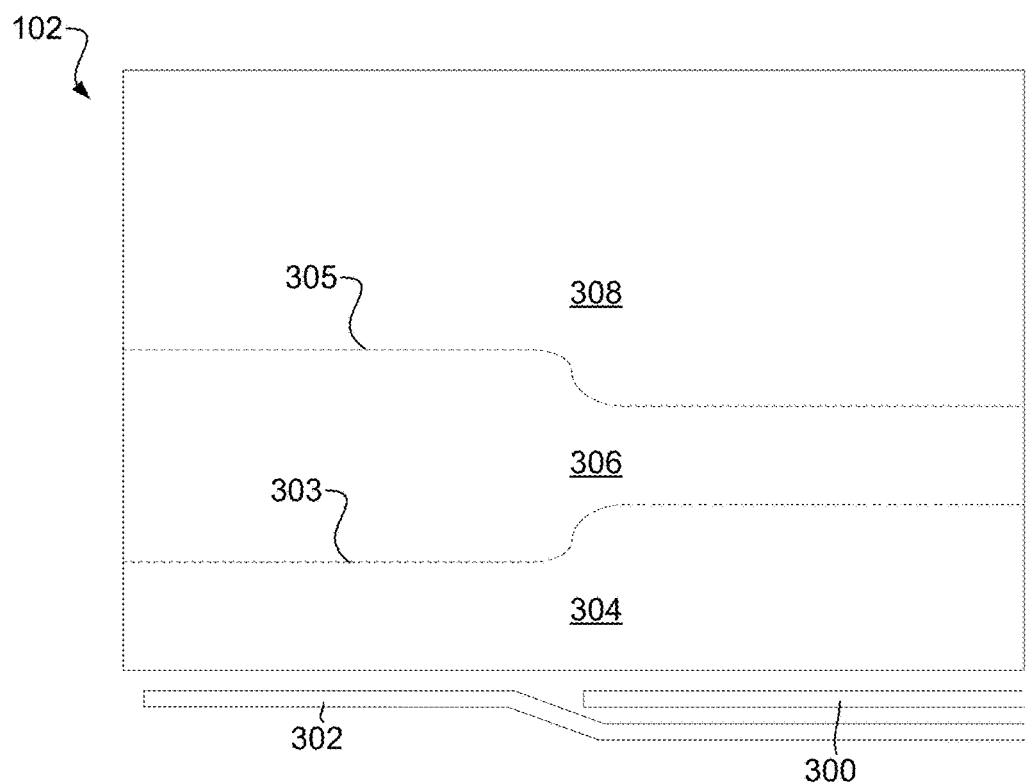
FIG. 16 depicts an example of a shield structure in accordance with disclosed embodiments.

FIG. 16 depicts an example, where the amount of shielding based on the electrical characteristics of the first antenna 300 includes a larger area with less shielding, but transitions more quickly to the second region 306 with more shielding. On the other hand, the electrical characteristics of the second antenna 302 may make it desirable to have a smaller area with less shielding proximate to the second antenna and a longer transition area to the regions with no openings in the shielding. While these examples have depicted touch sensors having specific configurations with varying amounts of shielding, any arrangements of different sizes and geometries of regions with varying amounts of shielding may be used in accordance with the principles described herein.

Figure 17:
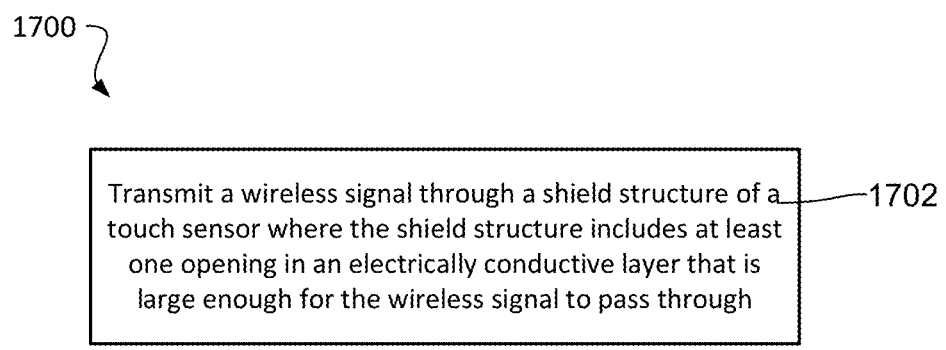
FIG. 17 depicts an example of a method for transmitting a wireless signal in accordance with disclosed embodiments.

FIG. 17 depicts an example of a method 1700 of transmitting a signal. This method 1700 may be performed based on the description of the devices, module, and principles described in relation to FIGS. 1-16. In this example, the method 17 includes transmitting 1702 a wireless signal through a shield structure of a touch sensor where the shield structure includes at least one opening in an electrically conductive layer that is large enough for the wireless signal to pass through.

In some examples, the wireless signal is a WiFi signal, a Bluetooth signal, a near field communication signal, a wireless signal with another radio frequency, or combinations thereof. The device with the touch pad may be a laptop, a desk top, an external pad for providing input to a computing device or to the cloud computing device, a computing device, a networked device, an electronic tablet, a mobile device, a personal digital assistant, a control panel, a gaming device, a flat panel, a display, a television, another type of device, or combination thereof.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. An apparatus, comprising:
   a touch sensor;
   a first antenna;
   a shield structure positioned between the touch sensor and the first antenna such that the shield structure shields portions of the touch sensor; and
   at least one radio frequency transparent section incorporated into the shield;
   wherein the radio frequency transparent section allows radio frequency to pass through the shield structure and the touch sensor.

2. The apparatus of claim 1, wherein the shield structure further includes a metal layer deposited on an electrically insulating material, and the radio frequency transparent section includes an opening defined in the metal layer that allows radio frequency to pass through a center of a sensor cell of the touch sensor.

3. The apparatus of claim 2, wherein the touch sensor includes a mutual capacitance intersection between a first electrode and a second electrode; and the radio frequency transparent section is offset from the mutual capacitance intersection.

4. The apparatus of claim 3, wherein the metal layer shields the mutual capacitance intersection and electrodes of the touch sensor while allowing the radio frequency to pass through the openings between electrodes of the touch sensor.

5. The apparatus of claim 4, wherein the metal layer has an increased area that overlaps with the mutual capacitance intersection.

6. The apparatus of claim 2, wherein the touch sensor further includes first mutual capacitance intersection spaced away from the first antenna at a first distance and a second mutual capacitance intersection spaced away from the first antenna at a second distance where the second distance is farther away from the first antenna than the first distance;
wherein a first metal layer area of the shield structure overlapping with the first mutual capacitance intersection is smaller than a second metal layer area of the shield structure overlapping with the second mutual capacitance intersection.

7. The apparatus of claim 1, wherein the shield structure further includes a metal layer deposited on an electrically insulating material, and the radio frequency transparent section includes multiple shield openings defined in the metal layer.

8. The apparatus of claim 7, wherein at least some of the multiple openings become progressively smaller as the distance from the first antenna increases.

9. The apparatus of claim 7, wherein the shield structure includes a first region with a first subset of shield openings having a first size and a second region with a second subset of shield openings having a second region having a second size, wherein the first region is closer to the first antenna than the second region, and wherein the first size is larger than the second size.

10. The apparatus of claim 1, further comprising:
a second antenna;
a second radio frequency transparent section incorporated into the shield structure that is sized based at least in part on a proximity to the second antenna; and
wherein the first radio frequency transparent section is sized based at least in part on a proximity to the first antenna.

11. An apparatus, comprising:
a touch sensor;
an antenna;
a shield structure positioned between the touch sensor and the antenna; and
patterned shielding areas incorporated into the shield structure;
wherein the patterned shielding areas include radio frequency transparent sections that allow radio frequency to pass through the shield structure and the touch sensor.

12. The apparatus of claim 11, wherein the patterned shielding areas are separated by openings defined in electrically conductive material.

13. The apparatus of claim 11, wherein the patterned shielding areas are positioned to shield mutual capacitance junctions of the touch sensor while leaving a center of at least some touch sensor cells open to allow radio frequency to pass through the center of the least some touch sensor cells.

14. The apparatus of claim 13, wherein the patterned shielding areas are positioned to shield individual sensor junctions.

15. The apparatus of claim 11, wherein the antenna is configured to transmit a WiFi signal.

16. The apparatus of claim 11, wherein the patterned shielding areas are connected radially.

17. The apparatus of claim 11, wherein the patterned shielding areas are configured to minimize an induced current from a near field communication antenna and reduce the power of a near field communication system.

18. An apparatus, comprising:
a touch sensor;
an antenna;
a shield structure positioned between the touch sensor and the antenna; and
multiple shield openings defined in an electrically conductive layer of the shield structure that are large enough to allow radio frequency to pass through the shield structure and portions of the touch sensor.

19. The apparatus of claim 18, wherein the electrically conductive layer defines the shield openings with multiple vertical columns and multiple horizontal rows positioned to overlap with a grid of electrode in the touch sensor.

20. The apparatus of claim 18, wherein multiple shield openings are located in a first region of the touch sensor proximate to the antenna and the shield structure comprises a solid electrically conductive layer without shield openings in a second region of the touch sensor that is spaced farther away from the antenna than the first region.

* * * * *